UNITED STATES PATENT OFFICE.

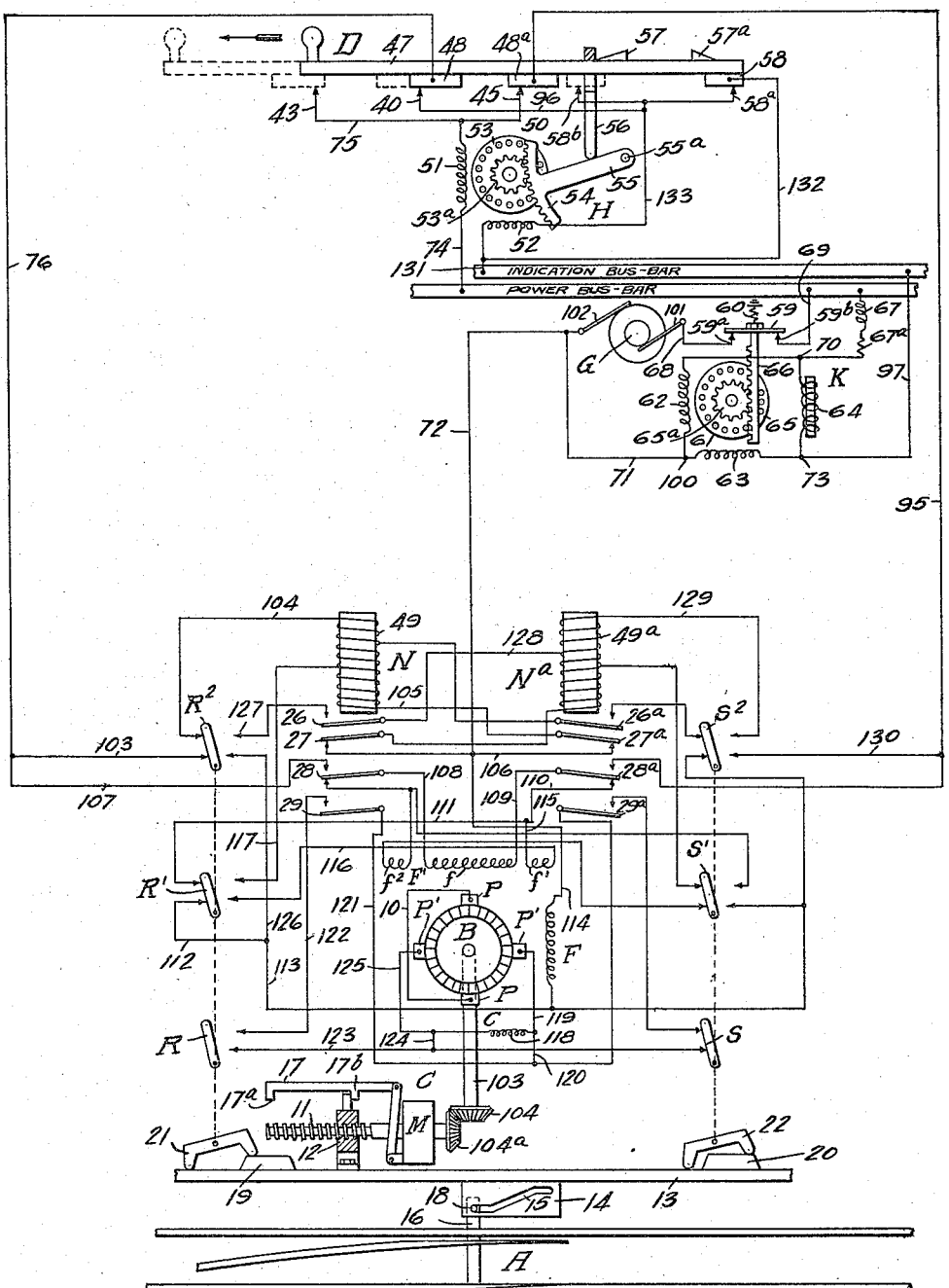

JOHN S. HOLLIDAY, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

APPARATUS FOR THE CONTROL OF ELECTRIC MOTORS.

1,147,171.     Specification of Letters Patent.     Patented July 20, 1915.

Original application filed April 23, 1914, Serial No. 833,892. Divided and this application filed January 26, 1915. Serial No. 4,483.

*To all whom it may concern:*

Be it known that I, JOHN S. HOLLIDAY, a citizen of the United States, residing at Wilkinsburg, in the county of Allegheny and State of Pennsylvania, have invented certain new and useful Improvements in Apparatus for the Control of Electric Motors, of which the following is a specification.

My invention relates to apparatus for the control of electric motors.

The present application is a division of my copending application filed April 23, 1914, Serial No. 833,892, for railway traffic controlling apparatus.

I will describe one form of apparatus embodying my invention, and then point out the novel features thereof in claims.

The accompanying drawing is a diagrammatic view showing one form of apparatus embodying my invention applied to a form of railway traffic controlling apparatus, as described in my above mentioned co-pending application.

Referring to the drawing, A designates a railway traffic controlling device, here shown as being a railway switch, which switch is operated by an electric motor B through the medium of a suitable operating mechanism C. This motor is supplied with operating current from a suitable source such as a single-phase generator G, the application of current from this generator to the motor being directly controlled by two relays N and $N^a$, which are in turn controlled by a manually operated controlling lever D, usually one of a plurality of similar levers in an "interlocking machine". The movements of this lever D are controlled by an indication device H, which device is controlled by current generated at times by motor B, as hereinafter explained.

K is a circuit breaker arranged to permit the operation of the motor B by current which reaches it through the proper channels from the generator G, but to prevent the false operation of the motor in case of crossed wires.

The motor B as here shown is a repulsion motor which may also be operated as a single phase induction motor as is explained hereinafter, comprising two field windings F and F', and two pairs of brushes P, P and P', P'. The brushes P, P are permanently short-circuited by a conductor 10, and the other pair are short-circuited at times as hereinafter explained. The two windings F and F' are located substantially 90 electrical degrees apart and the two pairs of brushes are also located substantially 90 electrical degrees apart, the pair P, P being located at an angle to the resultant magnetic field produced by the two windings F and F'. Winding F' of switch motor B comprises three sections, $f$, $f'$ and $f^2$. When the motor is operating as a repulsion motor, section $f$ only is energized, this section, coöperating with winding F, being sufficient to produce the necessary torque; when, however, the motor is operating as a single phase induction motor on winding F' only, section $f$ and one or the other of the remaining sections of this winding are energized. This arrangement of winding F' is desirable because it permits the use of a small motor in an economical manner.

The rotating member of motor B is operatively connected with a screw 11 through the medium of a shaft 103, bevel gears 104, $104^a$, and a clutch device M, which latter, as here shown, is mechanically controlled, and may be of a type such as is shown in United States Letters Patent No. 870,912 granted to John D. Taylor on November 12, 1907. The screw 11 coacts with a threaded block 12 fixed to a bar 13, so that this bar may be reciprocated by reverse operations of the motor when the clutch M is operative. The clutch device M is controlled by means of a link 17 having two fingers $17^a$ and $17^b$, one or the other of which is engaged by the block 12 when the bar 13 has reached one extremity of its stroke or the other, thereby disconnecting clutch M. Secured to the bar 13 is a cam plate 14 having a cam slot 15 which operates a stud or roller 18, and this stud or roller actuates a rod 16 which is connected with the movable rails of switch A. It will be seen, therefore, that reciprocation of bar 13 will cause reverse movements of switch A. The bar 13 is provided with cams 19 and 20 which operate two pivotally mounted rocking arms 21 and 22; the arm 21 actuates contacts R, R' and R², and the arm 22 actuates contacts S, S' and S².

It is understood that the operating mechanism C, which I have just described, is merely illustrative and that any suitable form of mechanism may be employed in lieu thereof.

The supply of current to switch motor B is controlled by two relays N and Nᵃ which are in turn controlled by the manually operable circuit controller D, as pointed out hereinbefore. Lever D as here shown comprises a longitudinally movable bar 47 which carries two contact blocks 48 and 48ᵃ which coöperate with contacts 43, 40 and 45. Usually this lever will be one of a number of similar levers comprised in an interlocking machine, and it is understood that this lever may operate suitable means for locking and unlocking other levers of the same machine; such means are well understood in the art and have no bearing on the present invention, hence all illustration and description thereof are omitted.

The indication device H, which controls the movements of lever D, comprises an induction motor 50 having two stator windings 51 and 52 and a rotor 53. The rotor 53 operates a pinion 53ᵃ which meshes with a curved rack 54 carried by an arm 55 pivoted at 55ᵃ. When motor 50 is energized, the arm 55 raises a latch 56 out of the path of dogs 57 and 57ᵃ carried by lever 47, thereby permitting the stroke of the lever to be completed. Winding 52 of motor 50 may be short circuited by a low resistance shunt, which shunt is opened and closed by a contact device comprising a block 58 operated by a bar 47 and coöperating with two fixed contacts 58ᵃ and 58ᵇ, which contact device operates in such manner that the shunt is closed when the bar 47 occupies either extreme position of its stroke, and open at all other times. The purpose of this shunt will appear hereinafter.

It is understood that the form of manually operated lever and the form of indication device which I have shown and described are merely illustrative. Several different forms of these devices are known in the art, any of which may be employed in lieu of those which I have shown.

Extending from the control lever D to the circuit relays N and Nᵃ and switch motor B are three wires 76, 95 and 72; the circuit for an operation of the switch A in one direction includes wires 76 and 72, and the circuit for an operation of the switch in the other direction includes wires 95 and 72. Hence, I will hereinafter term wires 76 and 95 the "control wires" and wire 72 the "common return wire."

The circuit breaker K comprises two contacts 59ᵃ and 59ᵇ, and a bridging member 59. The member 59 is biased to the open position by a spring 60 but is held closed against the action of the spring by a motor 61 when the motor is properly energized. This motor is of the induction type comprising two stator windings 62 and 63 and a rotor 65. The rotor carries a pinion 65ᵃ which meshes with rack teeth cut in a bar 66, which bar is operatively connected with the bridging member 59. The two stator windings are connected at a point 100 and this junction point is connected with one terminal 102 of generator G through a wire 71. The remaining ends of the two motor windings are joined by an impedance 64 which as here shown is a reactance. Point 70 between the reactance and winding 62 is connected with a "power bus-bar" and thence to the other terminal 101 of the generator G through wire 69, contacts 59 and wire 68, while point 73 is connected with an "indication bus-bar" and thence, as will later be shown, with one or the other of the control wires. With this arrangement of the windings, if current from terminal 101 reaches the motor 61 at point 70 the reactance 64 will be in series with winding 63 and the motor will have torque in such direction as to tend to hold the contacts 59 closed; but in case of a cross between wires, as pointed out hereinafter in explaining how the apparatus is protected against false operation by crosses, current from terminal 101 might reach the motor 61 at point 73, that is, between winding 63 and reactance 64, and in such cases the reactance 64 will be in series with winding 62 and the motor will have torque in such direction as to tend to assist spring 60 to hold contacts 59 open.

The contact 59 is first closed by hand, and is then held closed by the motor 61 which is normally energized from the generator G through the following circuit—from terminal 101 through wire 68, contacts 59, wire 69, power bus-bar, impedances 67 and 67ᵃ, to point 70, thence through windings 62 and 63 in multiple, reactance 64 being in series with winding 63, then through wires 71 and 72 to generator G. The two windings 62 and 63 are thus supplied with currents of the proper phase relation to energize the motor to hold the contacts 59 closed against the action of spring 60.

I have in the drawing shown a "power bus-bar" and an "indication bus-bar". These two bus-bars extend through a portion of the interlocking machine, and they may serve for a plurality of levers like lever D. In the case of a small machine having comparatively few levers these two bus-bars may serve for the entire machine. Only one circuit breaker K is required for each pair of bus-bars. Only one generator G is required for each pair of bus-bars, and one generator may, if desired, be employed for any number of pairs of bus-bars, that is, for an entire interlocking machine.

The operation of the apparatus is as follows: In the drawing I have shown the switch A in the "normal" position, and the remainder of the apparatus in the positions corresponding to this position of the switch. When it is desired to move the switch to the reverse position, the manual lever D is moved in the direction indicated by the arrow until stopped by the engagement of dog $57^a$ with latch 56. This movement causes contact block $48^a$ to engage with fixed contact 40 and contact block 48 to engage with fixed contact 43. The winding of relay N is then energized by the following circuit: from terminal 101 of generator G through wire 68, contact $59^a$—59—$59^b$, wire 69, power bus bar, wire 74, winding 51, wire 75 contact 43—48, wires 76 and 103, contact $R^2$, wire 104, entire winding 49 of relay N, wire 105, contact $27^a$ of relay $N^a$, wires 106 and 72 to terminal 102 of generator G. This causes relay N to close, thereby energizing windings F and $f$ of motor B through a circuit which is the same as that just traced as far as and including wire 76, then through wire 107, contact 28, wire 108, sections $f$ of winding F', wire 109, back point of contact $28^a$, wires 110 and 111, contact R', wires 112 and 113, winding F, wires 114 and 72 to generator G. At this time brushes P', P' are connected by the reactance 118, but brushes P are short circuited and are located at an angle to the resultant magnetic field produced by the two motor windings, so that the motor then operates as repulsion motor and moves the switch A. During the early part of the movement rocker arm 22 is reversed by cam 20, but this causes no change in the circuits. When the movement of the switch is completed clutch M is disengaged by finger $17^a$ and rocker 21 is reversed by cam 19, thereby reversing contacts R, R', and $R^2$. The reversal of contact R' disconnects motor winding F from the generator G and the reversal of contact $R^2$ opens the original circuit for winding 49 of relay N. A new circuit is now closed, including a portion of relay winding 49, and sections $f$ and $f'$ of motor winding F', this circuit being the same as the previously traced circuits up to and including wire 76, then through wire 107 front point of contact 28, wire 108, section $f$ of winding F', wire 109, back point of contact $28^a$, wires 110 and 115, winding section $f'$, wire 116, contact R', wire 117, lower section of relay winding 49, wire 105, contact $27^a$, wires 106 and 72 to the generator G. This current flowing through the lower section of relay 49 is sufficient to hold this relay in the closed position. The reversal of contact R closes a shunt around reactance 118 of motor B, which shunt is from wire 119 through wires 120 and 121, contact 29, wire 122, contact R, wires 123, and 124, to wire 125. The switch motor B being now disconnected from the switch by clutch M, and being already rotating, operates as a single-phase induction motor on the current supplied to winding sections $f$ and $f'$, and its generates an alternating current in winding F, the phase of which is substantially in quadrature to the electromotive force supplied to winding F'. This current is employed to energize winding 52 of indication motor 50, the circuit being from winding F through wires 113 and 126, contact $R^2$, wire 127, contact 26, wire 128, upper section of relay winding $49^a$, wire 129, contact $S^2$, wires 130 and 95, contact $48^a$—40, wires 96 and 133, motor winding 52, wire 131, indication bus-bar, wire 97, point 73, through windings 62 and 63 in multiple, reactance 64 being connected in series with winding 62, wires 71, 72 and 114 to motor winding F. The current from generator G in winding 51 and the current from winding F in winding 52 of the induction motor 50 co-act to operate this motor in such direction as to raise latch 56 out of the path of dog $57^a$, so that the movement of lever D can be completed to the position indicated in dash lines. The combined effect on the circuit breaker motor 61 of the indication current supplied at point 73 and of the power current supplied at point 70 is such as to cause the contacts 59 to remain closed, because the E. M. F. generated in winding F is substantially in quadrature with the E. M. F. of source G, and the relative direction is such that the resultant currents in windings 62 and 63 then differ in phase in the same direction as the currents which reach these windings from generator G through the point 70. It will be seen that the indication current passes through the upper portion of winding $49^a$ of relay $N^a$; owing, however, to the reactance of this winding and of motor winding 52, the current is insufficient to cause relay $N^a$ to close. When, however, the movement of lever D has been completed, motor winding 52 is shunted by contact $58^b$—58, and wire 132, so that the current in the indication circuit then becomes sufficient to close relay $N^a$. This opens the back point of contact $27^a$, thereby deënergizing relay N and motor winding F'. The motor then stops and both relays N and $N^a$ open so that no current is consumed by any of the parts of the apparatus except the safety circuit controller K. A movement of the switch A in the opposite direction would be accomplished in a manner similar to that just explained; that is, lever D would be moved back toward the position shown in solid lines, thereby energizing relay $N^a$ and supplying current to motor windings F and F', the direction of current in the latter winding being reversed so that the motor B operates in the opposite direction to return the switch to normal position. Upon the completion of this movement winding F would again be disconnected from the generator and the current generated in this winding would be employed to control indication motor 50.

The system is protected against false operation by crossed wires (that is, by falsely connected wires) in the following manner: With the parts in the position shown in the drawing, wire 76 is the next control wire, that is, it is the wire to which terminal 101 of generator G will be connected to cause switch A to be reversed, the current returning to the other terminal of generator G through the common return wire 72. This wire 76 might by accident receive current from terminal 101; this might occur, for example, by a cross between wires 76 and 95, in which case current would flow from terminal 101 through wire 68, contact 59, wire 69, power bus-bar, wire 74, winding 51, contact 48ª, wire 95 to the point of false contact with wire 76, then through wire 76, contact 48, wire 96, winding 52, indication bus-bar, wire 97, then from point 73 through motor windings 62 and 63 in multiple, reactance 64 being in series with winding 62. The torque produced on motor 61 by this current will be opposite to that produced by the current supplied from generator G at the point 70, but since this latter current must pass through the impedances 67 and 67ª its effect on the motor will be reduced and the effect of the cross current will predominate so that the motor will be operated by the cross current to open contacts 59. This will open the circuits of relay N and Nª and motor B so that the switch motor B will therefore not be operated. When the cross is removed, contacts 59 can be again closed by hand and the system is again ready for proper operation. It is, of course, essential that the value of impedances 67 and 67ª should be greater than the value of the impedance of motor winding 52.

Although I have herein shown and described only one form of apparatus embodying my invention, it is understood that various changes and modifications may be made therein within the scope of the appended claims, without departing from the spirit and scope of my invention.

Having thus described my invention, what I claim is:

1. In combination, a railway traffic controlling device, electrically controlled means for the operation of said device, a source of single phase alternating current, two control wires, means for connecting one terminal of the said source with one or the other of the control wires, a circuit breaker included between the source and the said means, an alternating current motor for the operation of the circuit breaker which motor comprises two field windings and an impedance the windings being connected with the source in multiple with each other and normally having the impedance in series with one of the windings, whereby the motor has torque in one direction to hold the circuit breaker closed, a tap at the point between the impedance and the winding with which the impedance is normally in series, a circuit controller for connecting said tap with the next control wire, whereby in case of a cross between the next control wire and the terminal of the source which is connected with the control wires the motor would be connected with the source with the impedance in series with the other motor winding thereby producing torque in the direction to open the circuit breaker, and means for making the impedance of the normal circuit for the motor comparatively high.

2. In combination, a railway traffic controlling device, electrically controlled means for the operation of said device, a source of single phase alternating current, two control wires, means for connecting one terminal of the said source with one or the other of the control wires, a circuit breaker included between the source and the said means, an alternating current motor for the operation of the circuit breaker which motor comprises two windings and a reactance the windings being connected with the source in multiple with each other and having the reactance in series with one of the windings, whereby the motor has torque in one direction to hold the circuit breaker closed, a tap at the point between the reactance and the winding with which the reactance is normally in series, a circuit controller for connecting said tap with the next control wire, whereby in case of a cross between the next control wire and the terminal of the source which is connected with one or the other of the control wires the motor would be connected with the source with the reactance in series with the other motor winding thereby producing torque in the direction to open the circuit breaker.

3. In combination, a railway traffic controlling device, electrically controlled means for the operation of said device, a source of single phase alternating current, two control wires, means for connecting one terminal of the source with one or the other of the control wires, a circuit breaker included between the source and the said electrically controlled means, an induction motor for the operation of the circuit breaker said motor comprising two stator windings and an impedance one end of each winding being electrically joined and the junction point being connected with the terminal of the source which is not connected with the control wires, the impedance being connected between the remaining ends of the two windings, the point between the impedance and one winding being connected with the other terminal of the said source and the point between the impedance and the other winding being connected with the next control wire.

In testimony whereof I affix my signature in presence of two witnesses.

JOHN S. HOLLIDAY.

Witnesses:
A. L. VENCILL,
A. C. NOLTE.

Copies of this patent may be obtained for five cents each, by addressing the "Commissioner of Patents, Washington, D. C."